May 15, 1962  W. SCHULZ  3,034,673
CONTAINER CARRIER
Filed May 27, 1960  2 Sheets-Sheet 1
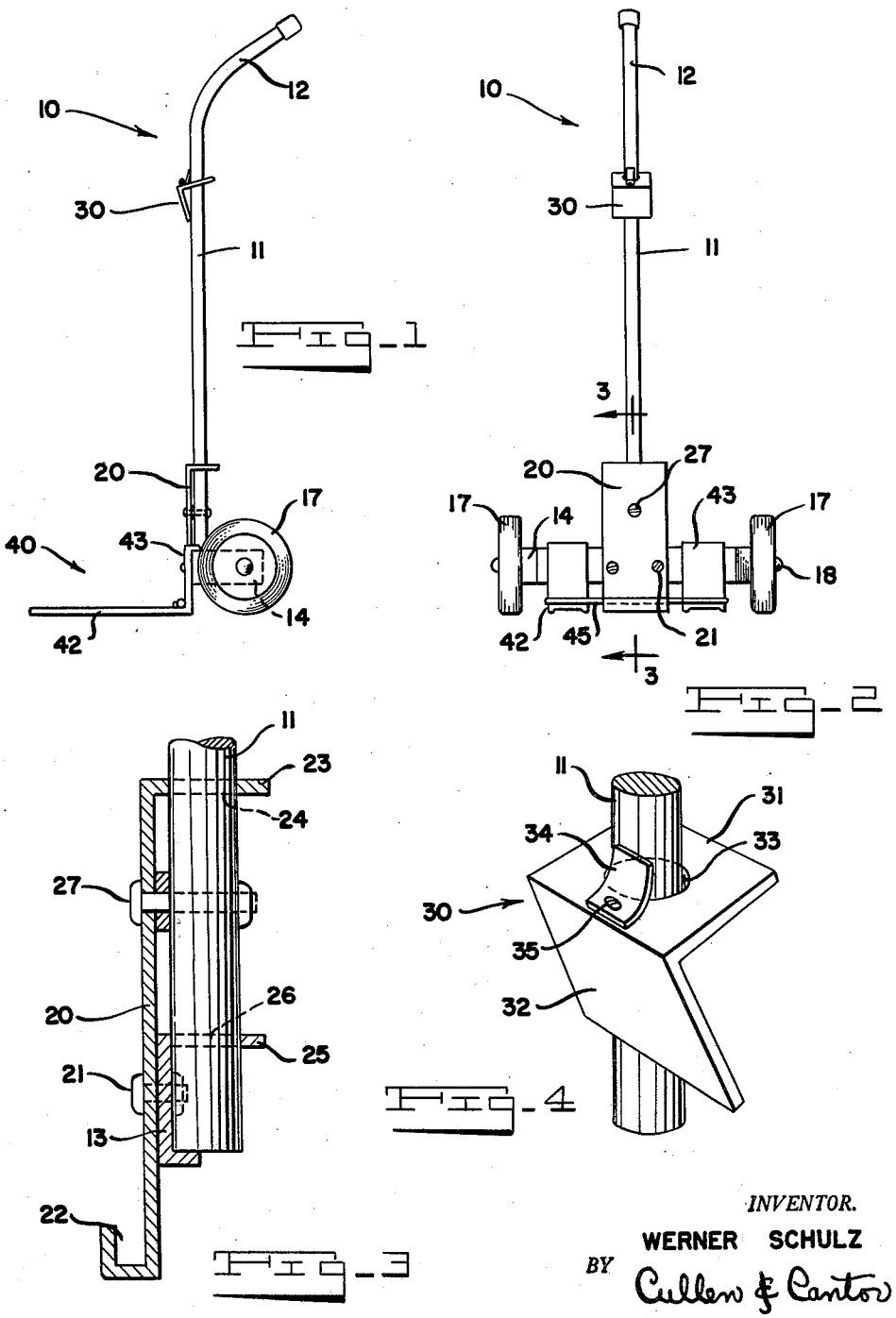
INVENTOR.
WERNER SCHULZ
BY Cullen & Cantor
ATTORNEYS May 15, 1962 W. SCHULZ 3,034,673
CONTAINER CARRIER
Filed May 27, 1960 2 Sheets-Sheet 2
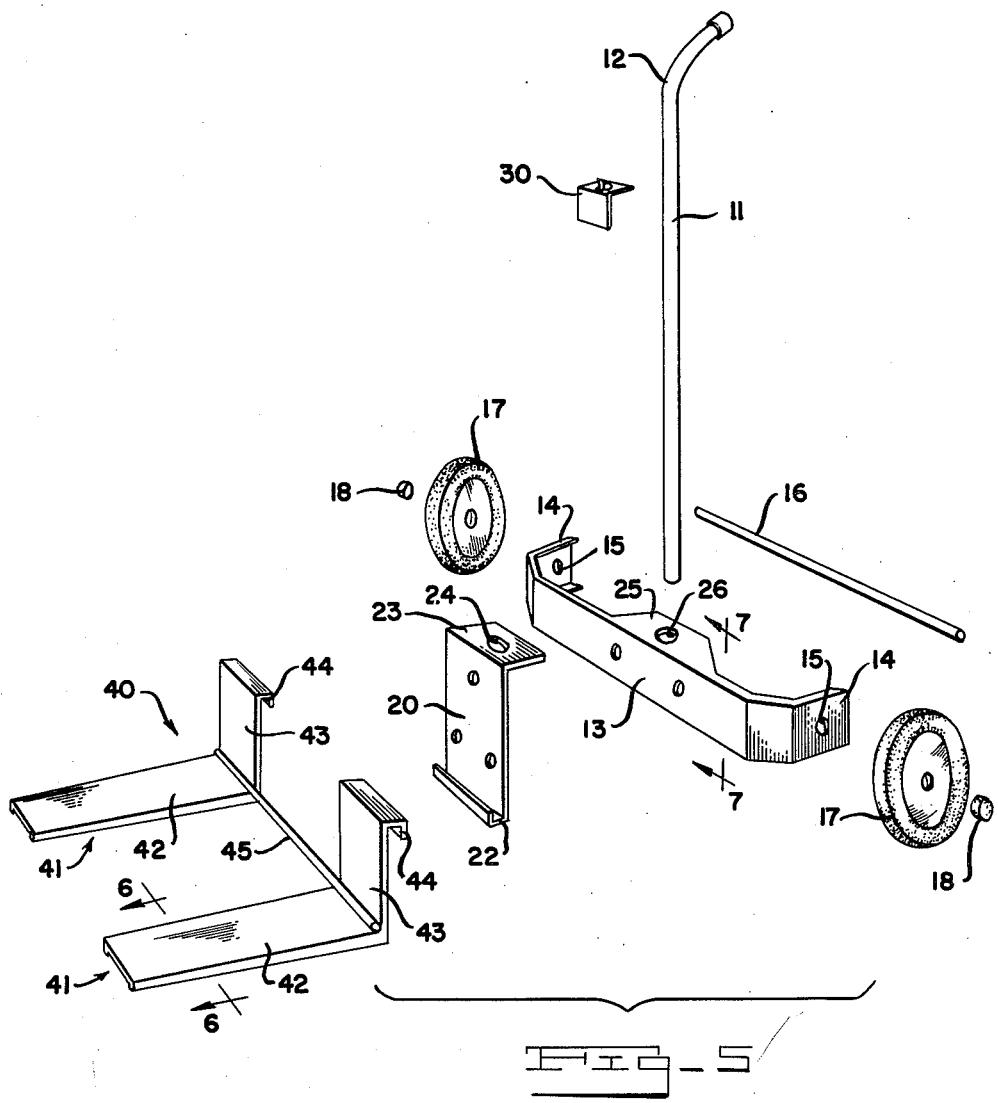
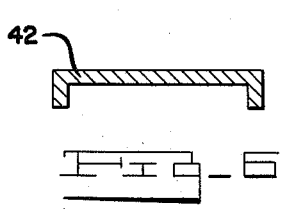
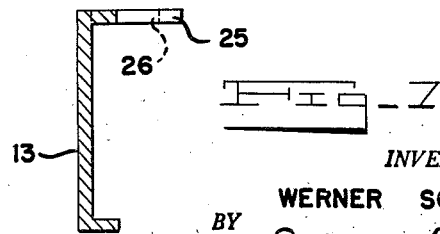
INVENTOR.
WERNER SCHULZ
BY Cullen & Canton
ATTORNEYS

United States Patent Office 3,034,673
Patented May 15, 1962

3,034,673
CONTAINER CARRIER
Werner Schulz, Detroit, Mich., assignor to Ace Tool & Manufacturing Company, Detroit, Mich.
Filed May 27, 1960, Ser. No. 32,464
3 Claims. (Cl. 214—384)

This invention relates to a container carrier and more particularly to a cart for carrying containers such as garbage cans and the like, such as are disclosed in the application filed by Van Lokeran et al., Ser. No. 839,953, filed September 14, 1959, now Patent No. 3,008,595.

The invention hereof relates to certain improvements made to the cart of the above mentioned application wherein the cart may be inexpensively constructed, adapted to be made, shipped and sold in a kock-down or disassembled condition for assembly by the purchaser with a minimum number of tools, namely, a pair of pliers, and to form a rigid unit construction when assembled.

An object of this invention is to form a cart or container carrier which is extremely rigid and durable, is inexpensive, is formed of a number of parts adapted to be put together by simplified connections, but which forms a rigid unit upon assembly and which is adaptable for carrying cans of the garbage can variety or other types of containers such as boxes, bags and the like which the average homeowner is frequently called upon to transport.

Another object of this invention is to form such a cart having a removable attachment which is simply, but rigidly, secured to the cart and is arranged to support the bottom of various types of containers so that the cart may be used for a wide variety of containers without the need for any tools for converting the cart for the carrying of one type of container or another.

Yet another object of this invention is to form a fastening means to secure the top of a container to the top of the cart which fastening means requires no adjustments or tools and may be easily slipped in place and removed from place by a single movement of the user's arm.

These and other objects and advantages of this invention will become apparent upon reading the following description, of which the attached drawings form a part.

In these drawings:

FIG. 1 is a side elevational view of the cart or container carrier with the attachment secured thereto.

FIG. 2 is a front elevational view of the same.

FIG. 3 is an enlarged fragmentary view showing the connection of the pole to the horizontal strip and the front plate.

FIG. 4 is an enlarged perspective view of the top fastening means and a portion of the pole.

FIG. 5 is an exploded perspective view of the various parts of the device.

FIGS. 6 and 7 are cross-sectional views taken in the direction of arrows 6—6 and 7—7 of FIG. 5 respectively.

The cart herein is generally designated as 10. It includes an elongated pole 11 which may be formed of a piece of metal tubing which is rigid and has a uniform cross-section and its upper end is bent to form a handle of grasping portion 12.

The bottom end of the cart is formed of a horizontally arranged strip 13 which is made of a thin, rigid, narrow metal sheet which may be U-shaped in cross-section as shown in FIG. 7 and whose ends 14 are bent backwards, parallel to each other so that they form support means for the wheels of the cart. Each of the ends are provided with an opening 15 through which a shaft 16 is journalled. Wheels 17 are mounted on the ends of the shaft and are held in place by conventional friction type caps 18. The strip has a forward face which is vertically arranged, as seen specificially in FIG. 5.

Centered on the forward face of the horizontal strip is a vertically arranged, narrow, rigid plate 20 which has its lower end bent upwardly into a channel 22. The plate is secured to the center portion of the horizontal strip by means of nuts and bolts 21 and the channel is so located that it is about even with the distance that the wheels extend beneath the horizontal strip so that the two wheels and the channel portion 22 form a three point support for the cart with the pole arranged substantially vertically.

The top end of the plate 20 is bent rearwardly into a flange 23 provided with a central opening 24. Likewise, the center of the strip 13 has an integral portion which is bent back into a rearward flange 25 which is provided with an opening 26 that is axially aligned with the opening 24 in the flange 23. Thus, the bottom end of the pole 11 is inserted through both openings 24 and 26. The openings are of a size wherein the pole snugly and tightly fits through them with the bottom end of the pole extending downwardly the full height of the strip 13. The plate is additionally secured to the pole by means of a nut and bolt 27 (see FIG. 3).

The construction defined above comprises the basic cart and these parts may be made of rigid metal strips or sheet such as aluminum or steel of a single gauge so that the manufacturer need stock but only one gauge of metal for his raw material with the exception of the shaft 16 and the pole 11.

In operation, the cart normally rests upon a three point support, namely, the bottom of the channel 22 and the two wheels. When it is desired to use the cart, it is rolled by tilting the handle 11 backwards, towards a garbage can or the like and the can is tilted slightly so that the bottom lip of the can fits into the channel 22. In order to secure the top of the container to the cart, a fastening means 30 is provided. This fastening means consists of a right angle made of a rigid integral piece of metal provided with a transverse leg 31 and an integral depending leg 32. The transverse leg is provided with a central opening 33 which is slightly larger in diameter than the diameter of the pole. The pole loosely fits through the opening 33 and normally the fastener or angle would slide up and down on the pole freely. To hold the angle in fixed position on the pole, a leaf spring 34, in form of a short length of springy sheet metal is secured by a rivet 35 to the transverse leg 31. Its upper end bears against the pole as shown in FIG. 4 and thus by spring pressure, frictionally secures the pole between the spring 34 and the edge of the opening 33. Thus, the angle is held at any position desired.

When the cart is used to transport a container, the angle or fastener 30 is slid down so that its depending flange 32 reaches over the top flange or edge of the container and then, when the handle 11 is tilted backwards so that the cart tilts on its wheels, the container being supported on the channel 32 and being off balance, tilts forwardly of the cart and thus, tilts the depending leg 32 forwardly away from the pole. This action, causes the transverse leg 31 to cock at an angle relative to the pole and thus, the pole is locked against two opposite points of the edge defining the opening 33. Thus, the fastener is fixed in position until such time as the cart is tilted forwardly again so that the weight of the container no longer pulls the depending leg 32 forward.

The cart described above is suited for carrying containers of the garbage can type wherein there is a bottom lip or edge on the can. However, when a cart as described above is used around an ordinary home, the householder frequently has to transport other bulky items such as large boxes, bags of fertilizer, grocery shopping and the like. Thus, an attachment 40 is provided herein to convert the cart into a carrier for almost any size and type of container.

The attachment (see FIG. 5) consists of a pair of identical members 41 each being in the form of a rigid, elongated, strip which may be U-shaped in cross-section as shown in FIG. 6, with the depending legs facing downwardly. Each member is formed with a flat topped, elongated, rigid blade portion 42 with its end bent upwardly into a vertical portion 43 having its top bent into a downwardly opening channel 44. The channel 44 is of a size to snugly receive the top edge of the horizontal strip 13 to mount each of the members on the horizontal strip. In so mounting, the vertical portion 43 is in face to face contact with the front face of the horizontal strip 13 and depends below the strip a sufficient distance so that the blade 41 rests upon the ground when the cart is supported by the plate bottom channel 22 and the two wheels. That is, the vertical portions 43 are of a length substantially equal to the distance that the plate bottom edge and the wheels extend beneath the horizontal strip 13.

The attachment members may be mounted and used as two separate members and may be mounted and removed from the cart as desired. They may be easily handled and stored and require no tools or fasteners to lock them in place. The frictional engagement of the top edge of the strip 13 into the channels 44 are sufficient to hold these members in place.

However, the two members may be interconnected by a rigid rod 45 so that the two can be handled as a single unit. The rod 45 extends between the two members and can be welded or otherwise secured into the corners formed by the blade portions 42 meeting the vertical portions 43. Thus, the two members are automatically spaced and automatically held together. When mounted on the cart, the two channels 44 slip over the top edge of the horizontal strip 13, and the rod 45 fits into the upwardly opening channel 22 of the plate 20. Preferably, the rod is of sufficient diameter to snugly fit within the channel 22 and thus hold the members in place tightly enough so that they normally would not be dislodged even if the cart were moved over extremely bumpy ground.

This invention may be further developed within the scope of the following attached claims. Accordingly, it is desired that the foregoing description be read as being merely illustrative of an operative embodiment of this invention and not in a strictly limiting sense.

I now claim:

1. An article of the character described, comprising a normally substantially, vertically arranged pole of substantially uniform diameter throughout its length, wheel mounting means secured to the bottom end of the pole and wheels rotatably mounted upon said means, and a releasable locking means for securing the top edge of a container to the pole and means for securing the bottom edge of a container to the bottom end of the pole, said locking means comprising a thin, narrow, flat plate bent into a right angle and having an opening formed in one leg thereof, said opening being of a slightly greater diameter than the diameter of the pole and with the pole loosely passing through the leg opening so that said one leg is transversely arranged relative to the pole, the other leg of the angle being downwardly depending and integral with the said one leg and arranged in front of the pole, and a spring having an end secured to the top surface of said one leg and an opposite end spring pressed against the pole to frictionally hold the angle at fixed positions on the pole against the influence of gravity, and said opening being formed so that when the depending leg is tilted forwardly away from the pole, the edge defining the opening frictionally locks against the pole to lock the angle in a fixed position on the pole.

2. A cart for carrying containers, comprising a normally substantially, vertically arranged pole of uniform circular diameter throughout its length, wheel mounting means secured to the bottom end of the pole and wheels rotatably mounted upon said means; means for securing the bottom edge of a container to the bottom end of the pole and releasable locking means for securing the top edge of the container to the pole; said locking means comprising a thin, narrow, flat plate bent into a right angle shape having a first leg and a second leg; a centrally located, circular opening formed through said first leg, the opening being of a slightly larger diameter than the pole diameter and the pole being loosely fitted through said opening, with the first leg thus being arranged transversely of the pole and the second leg depending downwardly from the first leg; a spring in the form of a thin, flat, narrow strip of springy metal having one end thereof fastened to the angle on the top surface of said one leg and near the line of intersection of the two legs, the opposite end of the spring being bent upwardly and arranged with one of its flat faces pressing in face to face contact against the pole thus frictionally holding the angle to the pole in a fixed position with the angle arranged with said one leg tilting upwardly, relative to the pole, from said line of intersection towards its free end, and with the second leg tilting downwardly and towards the pole from the line of intersection to its free end; the opening being of sufficient size so that the second leg may be manually tilted to slope in a direction away from the pole for engaging the top edge of a container and with the first leg thus tilted downwardly, relative to the pole, from its line of intersection to its free end, both against the force of the spring, for frictionally pressing opposed points on the edge defining the opening against the pole for thus locking the angle in one fixed position while it is engaged with the top edge of a container.

3. A cart for carrying containers and the like, comprising a substantially vertically arranged pole forming a handle; an elongated, thin, narrow, rigid strip arranged horizontally and having a forward, flat face arranged vertically, with the ends of the strip bent backwardly relative to the face and bent parallel to each other and means rotatably mounting a wheel on each of said ends, the top edge of the strip at the center thereof being bent rearwardly, normal to the face to form a horizontally arranged flange, an opening formed in the flange and the bottom end of the pole being snugly fitted through the opening and extending downwardly substantially the full height of the strip; a thin, narrow, rigid, vertically elongated and vertically arranged plate, secured to the center of said strip, with the top of the plate extending a distance above the top of the strip and being bent rearwardly, parallel to the strip flange to form a plate top flange, and an opening formed in the plate top flange, aligned with the opening in the strip flange, and the pole fitting snugly through said opening in the plate top flange and mechanical fastening means securing the plate to the pole, the bottom end of the plate extending beneath the bottom edge of the strip a distance approximately equal to the distance that the wheels extend beneath the strip, and being bent forwardly and upwardly to form an upward opening channel extending the width of the plate; said pole being of substantially uniform diameter throughout its length and a releasable locking means for securing the top edge of a container to the pole, said locking means comprising a right angle having an opening formed in one leg, said opening being of a slightly greater diameter than the diameter of the pole and with the pole loosely passing through the leg opening so that said one leg is transversely arranged relative to the pole, and a downwardly depending leg integral with the transverse leg and arranged in front of the pole, and a spring having one end secured to said transverse leg and an opposite end spring pressed against the pole to frictionally hold the angle at fixed positions on the pole against the influence of gravity, and said opening in the transverse leg being formed so that when the depending leg is tilted forwardly away from the pole for engaging the top edge of a container, the edge defining the opening in said transverse leg frictionally locks against the pole to lock the angle in a fixed position on the pole against the force of the spring.

References Cited in the file of this patent

UNITED STATES PATENTS

| | | |
|---|---|---|
| 2,160,041 | Sooter | May 30, 1939 |
| 2,245,543 | Landsman et al. | June 10, 1941 |
| 2,417,918 | Fatur | Mar. 25, 1947 |
| 2,511,623 | Darcangelo | June 13, 1950 |
| 2,574,825 | Guild | Nov. 13, 1951 |
| 2,665,021 | Wight | Jan. 5, 1954 |
| 2,668,602 | Cushman | Feb. 9, 1954 |
| 2,808,163 | Petzke et al. | Oct. 1, 1957 |
| 3,008,595 | Van Lokeran et al. | Nov. 14, 1961 |